(12) United States Patent
Seshadri et al.

(10) Patent No.: US 11,847,128 B2
(45) Date of Patent: Dec. 19, 2023

(54) FLEXIBLY MANAGING RECORDS IN A DATABASE TO MATCH SEARCHES

(71) Applicant: eBay Inc., San Jose, CA (US)

(72) Inventors: Narayanan Seshadri, Pleasanton, CA (US); Justin Nicholas House, San Jose, CA (US)

(73) Assignee: EBAY INC., San Jose, CA (US)

( * ) Notice: Subject to any disclaimer, the term of this patent is extended or adjusted under 35 U.S.C. 154(b) by 210 days.

(21) Appl. No.: 15/981,863

(22) Filed: May 16, 2018

(65) Prior Publication Data

US 2019/0354624 A1   Nov. 21, 2019

(51) Int. Cl.
  *G06F 16/248*   (2019.01)
  *G06F 16/9535*   (2019.01)

(52) U.S. Cl.
  CPC ........ *G06F 16/248* (2019.01); *G06F 16/9535* (2019.01)

(58) Field of Classification Search
  CPC .... G06F 16/248; G06F 16/23; G06F 16/2474; G06F 16/9535; G06F 16/953; G06Q 30/0643; G06Q 30/02; G06N 20/00
  See application file for complete search history.

(56) References Cited

U.S. PATENT DOCUMENTS

| | | | |
|---|---|---|---|
| 7,389,251 B1 | 6/2008 | Woolston et al. | |
| 7,454,367 B2 | 11/2008 | Yu et al. | |
| 7,747,471 B1 * | 6/2010 | Brown | G06Q 30/02 705/26.5 |
| 8,626,605 B2 | 1/2014 | Mesaros | |

(Continued)

FOREIGN PATENT DOCUMENTS

| | | |
|---|---|---|
| WO | 2017/192745 A1 | 11/2017 |
| WO | 2019/222141 A1 | 11/2019 |
| WO | 2019/222141 A8 | 12/2019 |

OTHER PUBLICATIONS

International Search Report received for International Application No. PCT/US2019/032106 dated Jul. 26, 2019, 3 pages.

(Continued)

*Primary Examiner* — Mariela Reyes
*Assistant Examiner* — Fatima P Mina
(74) *Attorney, Agent, or Firm* — SCHWEGMAN LUNDBERG & WOESSNER, P.A.

(57) ABSTRACT

A system includes one or more processors and a non-transitory machine-readable storage device comprising processor executable instructions that, when executed, cause the one or more processors to perform a set of operations comprising receiving a search request for one or more database records of a network based publication system, and identifying a first database record corresponding to at least a portion of the search request, where the database record having a first element. The set of operations also include selecting a second element of a second database record based on the first database record and adjusting the first element of the database record based on the second element. The set of operations then includes generating a formatted user interface comprising a representation of the database record and the adjusted first element, and causing, in response to the search request, presentation of the formatted user interface on the remote computing device.

20 Claims, 6 Drawing Sheets

(56) References Cited

U.S. PATENT DOCUMENTS

| | | | |
|---|---|---|---|
| 8,996,495 B2* | 3/2015 | Rehman | G06F 16/954 |
| | | | 707/723 |
| 10,831,842 B2 | 11/2020 | Seshadri et al. | |
| 2002/0065744 A1 | 5/2002 | Collins | |
| 2004/0019552 A1 | 1/2004 | Tobin | |
| 2007/0094122 A1 | 4/2007 | Dillon-Ferris | |
| 2010/0076960 A1* | 3/2010 | Sarkissian | G06F 16/9535 |
| | | | 707/722 |
| 2010/0262495 A1* | 10/2010 | Dumon | G06Q 30/02 |
| | | | 705/14.54 |
| 2010/0262601 A1* | 10/2010 | Dumon | G06Q 30/0256 |
| | | | 707/727 |
| 2011/0246271 A1* | 10/2011 | Mesaros | G06Q 30/0222 |
| | | | 705/14.23 |
| 2012/0066208 A1* | 3/2012 | Yankovich | G06F 16/248 |
| | | | 707/723 |
| 2012/0278314 A1 | 11/2012 | Sundaresan et al. | |
| 2012/0303412 A1* | 11/2012 | Etzioni | G06Q 30/06 |
| | | | 705/7.31 |
| 2013/0084002 A1* | 4/2013 | Bhardwaj | G06K 9/4652 |
| | | | 382/165 |
| 2013/0290127 A1* | 10/2013 | Finseth | G06Q 30/0611 |
| | | | 705/26.4 |
| 2014/0067603 A1* | 3/2014 | Okoro | G06Q 30/0643 |
| | | | 705/26.35 |
| 2014/0280007 A1 | 9/2014 | Gardner et al. | |
| 2016/0005063 A1* | 1/2016 | Zimmerman | G06Q 30/0276 |
| | | | 705/7.35 |
| 2016/0189099 A1* | 6/2016 | Iqbal | G06Q 30/0633 |
| | | | 705/26.8 |
| 2016/0342288 A1* | 11/2016 | Konik | G06Q 30/0643 |
| 2017/0278062 A1* | 9/2017 | Mueller | G06Q 30/0631 |
| 2017/0292852 A1* | 10/2017 | Kojima | G01C 21/3608 |

OTHER PUBLICATIONS

Written Opinion received for International Application No. PCT/US2019/032106 dated Jul. 26, 2019, 7 pages.

International Preliminary Report on Patentability Received for Application No. PCT/US2019/032106, dated Nov. 26, 2020, 9 Pages.

* cited by examiner

//FLEXIBLY MANAGING RECORDS IN A DATABASE TO MATCH SEARCHES

TECHNICAL FIELD

Embodiments of the present disclosure relate generally to database systems and, more particularly, but not by way of limitation, to automatically augmenting database records with optional elements to satisfy a search.

BACKGROUND

Network based publication systems can process search requests to retrieve and present database records that match specified set of attributes. Often, several database records may match a particular set of attributes provided in a search request. However, whether a given database record matching a search request satisfies an intent of the search request (e.g., whether a given record is selected or consumed by a user issuing a search request) can depend of one or more optional differentiating elements or attributes associated with the record but which may be not specified in the search request. The particular set of optional elements that may cause one database record to satisfy an intent of a query may depend on a user issuing the search request, the objects represented in the database record, and other factors. In view of this, users that generate the database records for network based publication systems try to increase the likelihood of their records satisfying an intent of a search request by manually augmenting these records with a diverse set of optional features.

BRIEF DESCRIPTION OF THE DRAWINGS

Various ones of the appended drawings merely illustrate example embodiments of the present disclosure and cannot be considered as limiting its scope.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Manually augmenting, or generating, data records with sets of optional elements to satisfying search requests can be inefficient for a producer of the database records (hereinafter, "producer") and can result of inefficient operation of a query system or other database system. The process can be time consuming because a producer generating a new record may have to generate, a priori, a set of all optional elements that he believes can improve the likelihood that his new record will satisfy search requests submitted to the query system. In query systems where an optional element can affect a value of another element of a database record, such as a shipping option affecting the price of an item offered for sale in network-based marketplace, a producer may have to determine an updated value of an affected element for each desired combination of optional element impacting the value affected element. Such producers may also be encouraged to create duplicate records that are identical but for one or more optional elements. These manual techniques can also negatively impact the performance of query systems, such as by increasing the storage requirements and processing load of these systems. For example, each optional element added to a database record may be a new data object that is stored in a database or repository associated with the query system. Additionally, the manually selected optional features are static, and while they may be selected to improve the likelihood of a record satisfying a particular search request at the time of selection, these optional features are may not increase the likelihood of the record satisfying the large set of other relevant queries that can be provided to the query system. Furthermore, known query systems do not appear to have techniques for automatically matching a set of optional elements associated with a database record to a query matching the database record in a way that improves the likelihood of the record satisfying the query. More specifically, if a search request does not specify an optional feature, current query systems do not have adaptable techniques for using the optional feature to rank, or determine the effect of the optional feature on the likelihood that a database record having the optional will satisfy the search request. Consequently, these manual processes can result in longer times spent generating data records, and greater storage and processing requirements for query systems without providing commensurate improvements in the performance of these systems.

Embodiments of the present disclosure address some of these issues by providing a query system that dynamically associates one or more optional elements with a database record based on the likelihood that the one or more optional elements will cause the database record to match or satisfy a search request received by the system. In some embodiments, the one or more optional elements may be selected based on historical data associated with the database record (or similar database records) and a search request (or similar search requests). More specifically, optional elements may be selected and associated with a database record after a search request is received at a query system based on the content of the search request and records matching a least a portion of the search request. This technique may enable the selection of optional elements to be automatically adapted for the received search request while reducing the required amount of storage associated with the network-based storage system. This technique may also reduce the effort and time a producer expends generating and adding database records to the query system, such as by freeing the producer from having to make potentially complex decisions about augmenting his records with optional elements. In some embodiments, this technique may provide further storage and processing benefits by reducing the likelihood that a producer will generate duplicate records having slightly different optional elements to satisfy a larger number of search requests.

As used herein, a query system can be a network-based presentation system, such as an online or networked-based marketplace. In such a marketplace, a seller (e.g., a producer) can create a listing (e.g., a database record) of an item offered for sale along with a selection of one or more features (e.g., optional elements) associated with item. Such features can include a sale format (e.g., auction, or fixed price sale), a shipping condition (e.g., overnight or two-day shipping, ground delivery, etc.), return policy (e.g., 30-day moneyback guaranteed), accessories associated with the item (e.g., adaptors, cases, removable memory, etc.), warranty offers (e.g., no warranty, one-year warranty, etc.). The selection of features listed with the item can influence whether the listing shows up in the search request generated by a buyer. Additionally, although one or more features may not be explicitly specified in a search request, the availability of the certain features can affect whether a buyer purchases the listed item. The selection of features that provide the greatest success can change dynamically based on, for example, trends in buyer preferences and costs for certain features. Embodiments of the present disclosure improves the process of listing items in network-based marketplaces by using historical data to dynamically determine the listing features and the price of listings based on a range of optional features enabled by a seller. In various embodiments, optional features are dynamically associated with a listing to cause the listing to satisfy the most buyer search requests. The price of the list can then be automatically adjusted based on the optional features. According to various embodiments, the optional features and adjusted listing prices may be associated with a listing at the time the listing is rendered to a buyer.

As used herein, a database record matches a search request when one or more elements specified in the database record matches or corresponds to one or more elements in the search request. A database record can satisfy a search request, or the intent of a search request, when the database record is selected (e.g., a buyer purchases an item associated with the database record) by a user from among one or more similar database records. Database records may be similar, with respect to a given query, when each database record match a given search request. Two database records may be similar when they only differ by one or more optional elements (e.g., optional features).

As used herein, an optional element or optional feature may be an element or feature that is not an inherent or required attribute or feature of an item associated with a database record. In some embodiments, an optional element may be specified by a producer, while in other embodiments, an optional element may be automatically associated with a database record according to the techniques described herein. In certain embodiments, optional features may be included as a search element in a search request.

Figure 1:
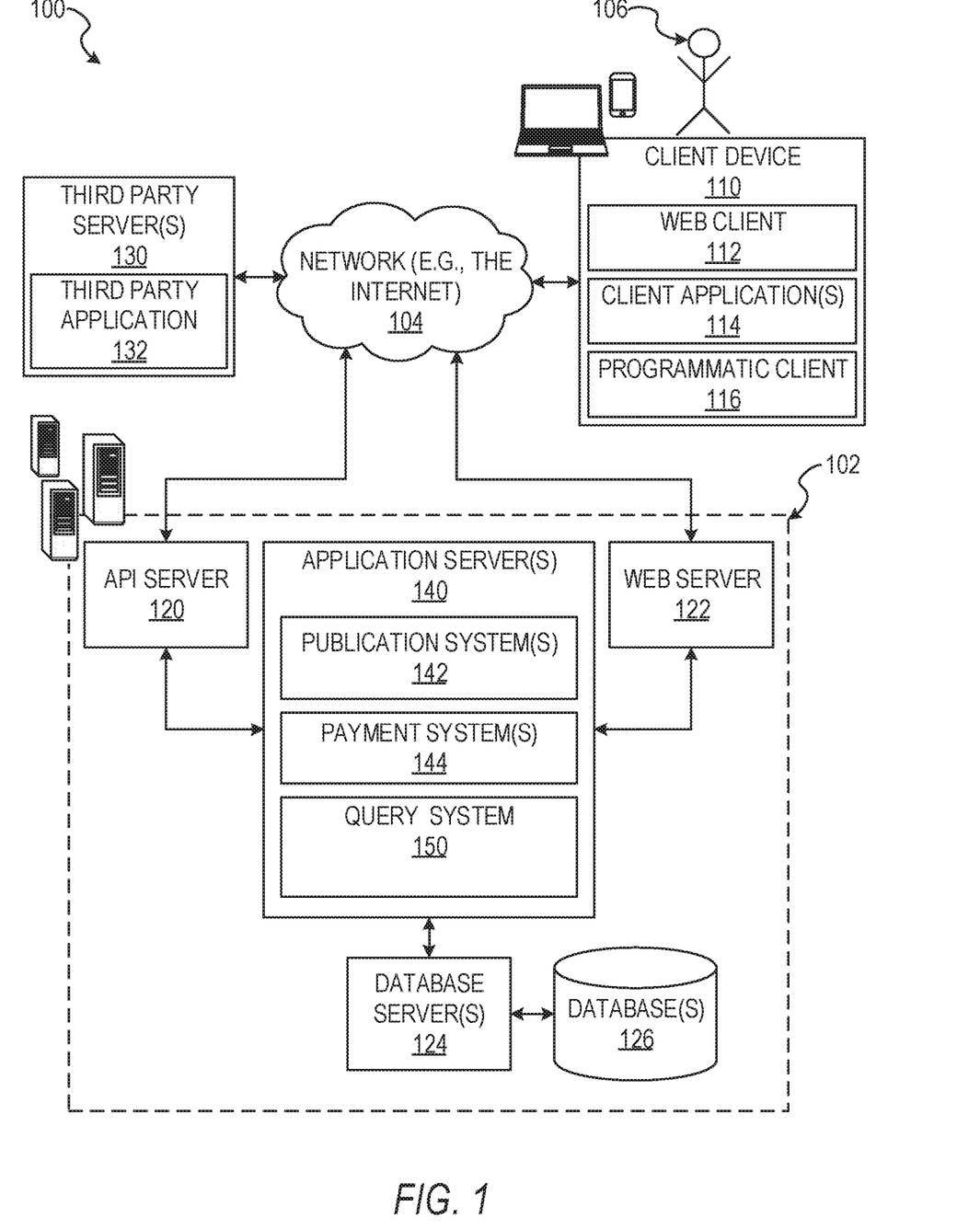
FIG. 1 is a block diagram illustrating a networked system such as network-based presentation system, according to various embodiments.

With reference to FIG. 1, an example embodiment of a high-level client-server-based network architecture 100, including a query system 150, is shown. A networked system 102, in the example forms of a network-based marketplace or payment system, provides server-side functionality via a network 104 (e.g., the Internet or wide area network (WAN)) to one or more client devices 110. FIG. 1 illustrates, for example, a web client 112 (e.g., a browser, such as the Internet Explorer® browser developed by Microsoft® Corporation of Redmond, Wash. State), an application 114, and a programmatic client 116 executing on client device 110.

The client device 110 may comprise, but are not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may utilize to access the networked system 102. In some embodiments, the client device 110 may comprise a display module (not shown) to display information (e.g., in the form of user interfaces). In further embodiments, the client device 110 may comprise one or more of a touch screens, accelerometers, gyroscopes, cameras, microphones, global positioning system (GPS) devices, and so forth. The client device 110 may be a device of a user that is used to perform a transaction involving digital items within the networked system 102. In one embodiment, the networked system 102 is a network-based marketplace that responds to requests for product listings, publishes publications comprising item listings of products available on the network-based marketplace, and manages payments for these marketplace transactions. One or more users 106 may be a person, a machine, or other means of interacting with client device 110. In embodiments, the user 106 is not part of the network architecture 100, but may interact with the network architecture 100 via client device 110 or another means. For example, one or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

Each of the client device 110 may include one or more applications (also referred to as "apps") such as, but not limited to, a web browser, messaging application, electronic mail (email) application, an e-commerce site application (also referred to as a marketplace application), and the like. In some embodiments, if the e-commerce site application is included in a given one of the client device 110, then this application is configured to locally provide the user interface and at least some of the functionalities with the application configured to communicate with the networked system 102, on an as needed basis, for data and/or processing capabilities not locally available (e.g., access to a database of items available for sale, to authenticate a user, to verify a method of payment, etc.). Conversely if the e-commerce site application is not included in the client device 110, the client device 110 may use its web browser to access the e-commerce site (or a variant thereof) hosted on the networked system 102. In some embodiments, the web client 112, the application 114, or the programmatic client 116 may include (e.g., host) at least or portion of the query system 150.

One or more users 106 may be a person, a machine, or other means of interacting with the client device 110. In example embodiments, the user 106 is not part of the network architecture 100, but may interact with the network architecture 100 via the client device 110 or other means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

An application program interface (API) server 120 and a web server 122 are coupled to, and provide programmatic and web interfaces respectively to, one or more application servers 140. The application servers 140 may host one or more publication systems 142 and payment systems 144, each of which may comprise one or more modules or applications and each of which may be embodied as hardware, software, firmware, or any combination thereof. The application servers 140 are, in turn, shown to be coupled to one or more database servers 124 that facilitate access to one or more information storage repositories or database(s) 126. In an example embodiment, the databases 126 are storage devices that store information to be posted (e.g., publications or listings) to the publication system 142. The databases 126 may also store digital item information in accordance with example embodiments.

Additionally, a third party application 132, executing on third party server(s) 130, is shown as having programmatic access to the networked system 102 via the programmatic interface provided by the API server 120. For example, the third party application 132, utilizing information retrieved from the networked system 102, supports one or more features or functions on a website hosted by the third party. The third party website, for example, provides one or more promotional, marketplace, or payment functions that are supported by the relevant applications of the networked system 102.

The publication systems 142 may provide a number of publication functions and services to users 106 that access the networked system 102. The payment systems 144 may likewise provide a number of functions to perform or facilitate payments and transactions. While the publication system 142 and payment system 144 are shown in FIG. 1 to both form part of the networked system 102, it will be appreciated that, in alternative embodiments, each system 142 and 144 may form part of a payment service that is separate and distinct from the networked system 102. In some embodiments, the payment systems 144 may form part of the publication system 142.

The query system 150 may provide functionality operable to perform various database query processing and presentation operations, including automatically augmenting a database record in the database 126 with optional elements based on the search query and historical data to improve the likelihood of the database record satisfying a search query (e.g., search terms, keywords, formatted selections, or combinations thereof), and generating a formatted user interface to present the augmented record. For example, the query system 150 may access user data records and the historical data from the databases 126, the third party servers 130, the publication system 142, and other sources. In some example embodiments, the query system 150 may analyze the user data records, the historical data, and search queries to perform database query processing operations in response to a search query, and to generate a formatted user interface including one or more database records automatically augmented as described herein. In some example embodiments, the query system 150 may communicate with the publication systems 142 (e.g., accessing database records in the form of item listings) and payment system 144. In an alternative embodiment, the query system 150 may be a part of the publication system 142.

Further, while the client-server-based network architecture 100 shown in FIG. 1 employs a client-server architecture, the present inventive subject matter is of course not limited to such an architecture, and could equally well find application in a distributed, or peer-to-peer, architecture system, for example. The various network-based presentation system 142, payment system 144, and query system 150 could also be implemented as standalone software programs, which do not necessarily have networking capabilities.

The web client 112 may access the various publication systems 142 and payment systems 144 via the web interface supported by the web server 122. Similarly, the programmatic client 116 accesses the various services and functions provided by the publication system 142 and the payment systems 144 via the programmatic interface provided by the API server 120. The programmatic client 116 may, for example, be a seller application (e.g., the Turbo Lister application developed by eBay® Inc., of San Jose, California) to enable sellers to author and manage listings on the networked system 102 in an off-line manner, and to perform batch-mode communications between the programmatic client 116 and the networked system 102.

Additionally, a third party application(s) 128, executing on a third party server(s) 130, is shown as having programmatic access to the networked system 102 via the programmatic interface provided by the API server 114. For example, the third party application 128, utilizing information retrieved from the networked system 102, may support one or more features or functions on a website hosted by the third party. The third party website may, for example, provide one or more promotional, marketplace, or payment functions that are supported by the relevant applications of the networked system 102.

Figure 2:
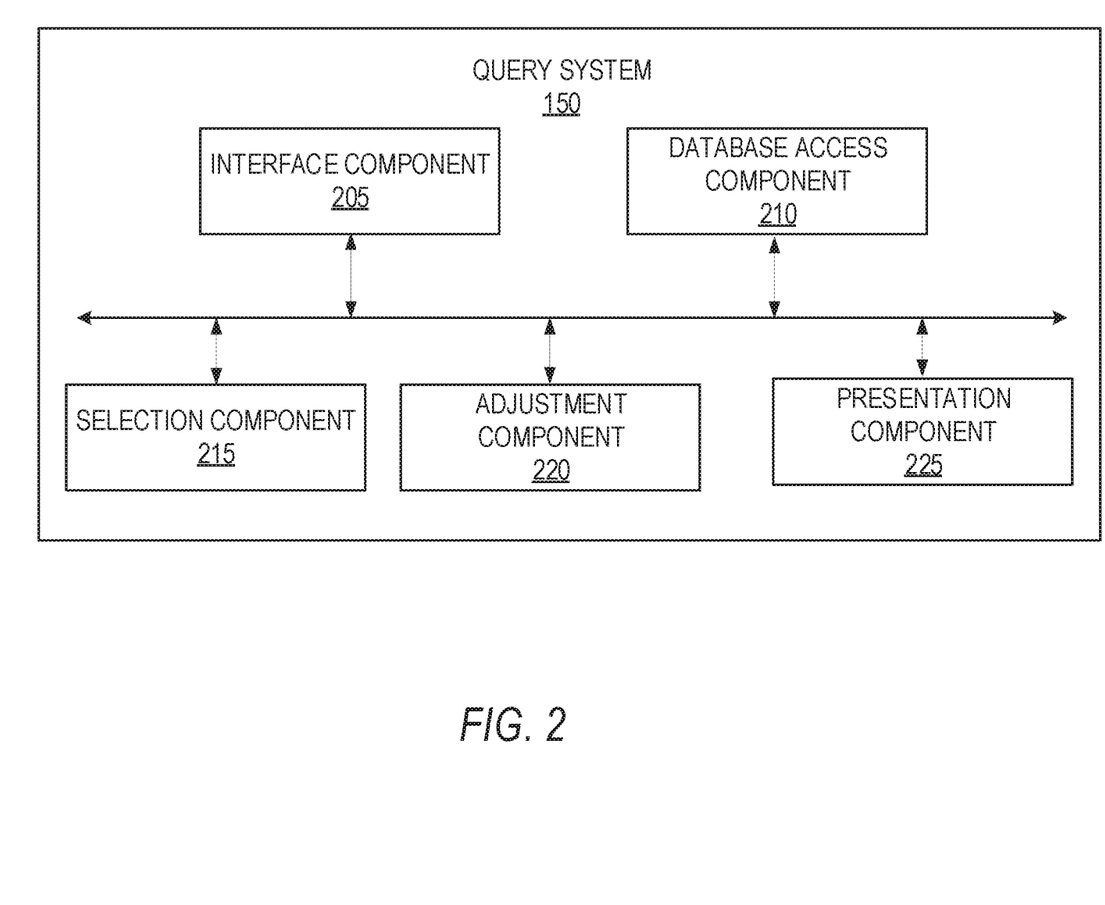
FIG. 2 is a diagram of an example of a query system, according to various embodiments.

FIG. 2 is a diagram of an example of a query system 150, according to various embodiments. The query system 150 can be include an interface component 205, a database access component 210, a selection component 215, an adjustment component 220, and a presentation component 225. The components of the query system 150 can be implemented using one or more hardware circuits (e.g., one or more processors of a machine) or a combination of one or more hardware circuits and software applications or modules. For example, any module or component described herein may configure a processor (e.g., among one or more processors of a machine) to perform operations for which that component is designed. Moreover, any two or more of these components may be combined into a single component, and the functions described herein for a single component may be subdivided among multiple components. Furthermore, according to various example embodiments, components described herein as being implemented within a single machine, databases (e.g., database 126), or device (e.g., client device 110) may be distributed across multiple machines, databases, or devices. Component of the query system 150 can be configured to communicate with each other using one or more network (e.g., using a network interface card, or other communication bus) or inter-process communication techniques (e.g., shared memory, or software sockets).

Figure 3:
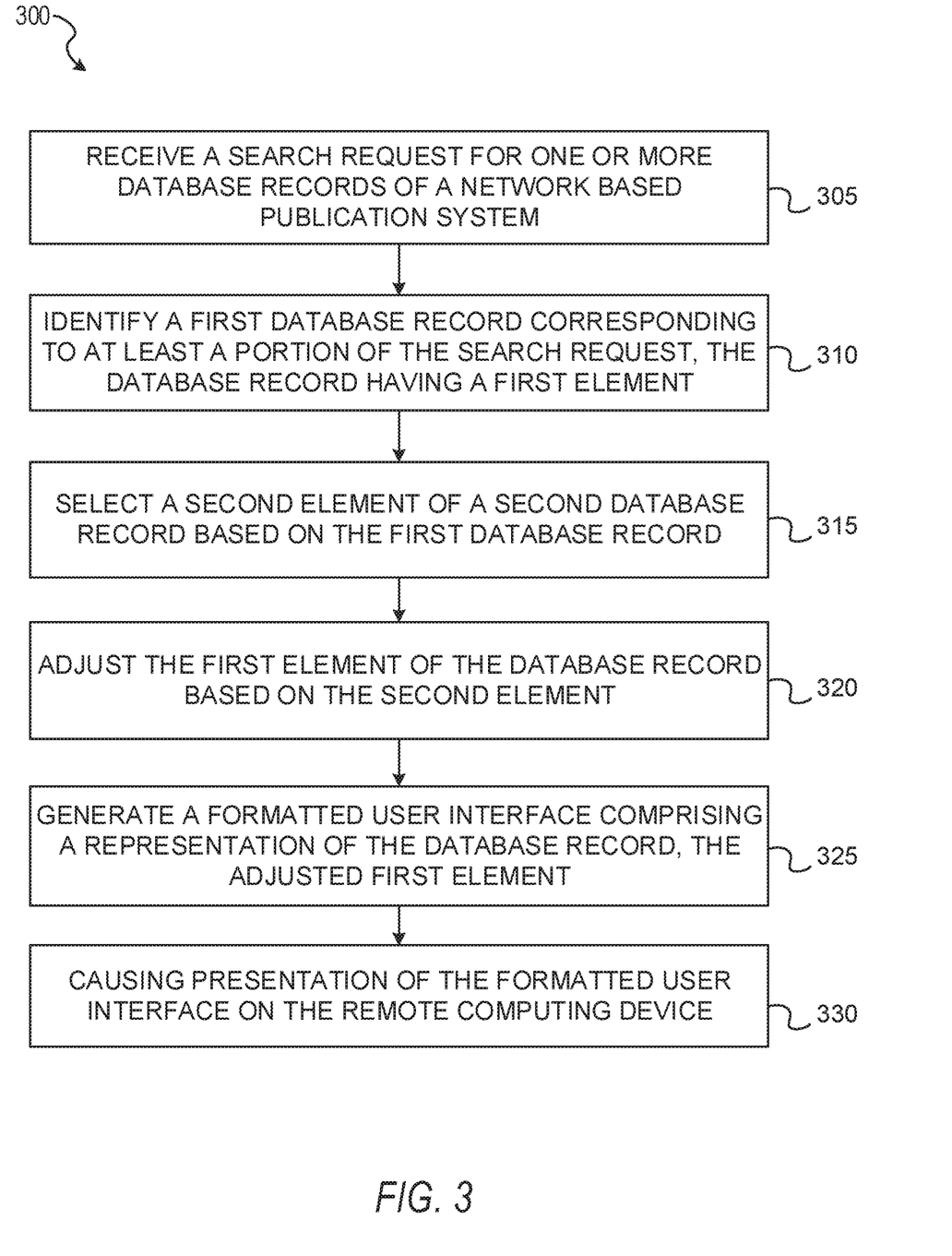
FIG. 3 is a diagram of a set of operations for operating a query system, according to various embodiments.

FIG. 3 is a diagram of a set of operations 300 for operating a query system, according to various embodiments. The operations 300 may be executed by the query system 150, as shown in FIG. 1 and FIG. 2. According to various embodiments, one or more of the operations 300 may be executed by one or more components of the query system 150, as shown in FIG. 2.

At operation 305, the query system 150 can receive a search request for one or more database records. In some embodiments, the search request can be received by the interface component 205 in response to input from a user 106 interacting with a user interface component of the network-based presentation system 102 hosted on the client device 110, as shown in FIG. 1. The user interface component may be a webpage generated by the network-based presentation system 102 (e.g., generated by presentation component 225) and transmitted to the client device 110 over the network 104. In other embodiments, the user interface component can be a client application 114 or a programmatic client 116. The search request can be received in response to the user 106 entering one or more search terms, selecting one or more control fields, clicking on one or more icons, or scrolling through one or more lists, of a form generated by the user interface component. In some embodiments, the user 106 can submit the search request to retrieve a listing of an item from a network-based marketplace.

The search request can include one or more search terms, such as keywords, phrases, or symbols. In some embodiments, one or more of the search terms can correspond to an element of a database record stored in the database 126. In certain embodiments, one or more of the search terms can correspond to a description, an attribute, or a value, of an element of a database record or an object represented by the database record. Returning to the example of the online marketplace, the one or more search terms can correspond to a selected category of items offered by the marketplace (e.g., consumer electronics, sporting goods, etc.), a specific item offered by the online marketplace (e.g., generic brand digital camera), or an attribute of a specific item (e.g., silver digital cameras). The interface component 205 can extract the search terms from the search request, such as to generate a database search query (e.g., a sequential query language search query) for searching the database 126.

At operation 310, the query system 150 can identify a database record (e.g., a first database record) corresponding to at least a portion of the search request received at operation 305. The database access component 210, for example, can identify one or more records matching the search request by executing the search query generated by interface component 205 on one or more tables of the database 126. In some embodiments, executing the search query can include executing a first portion of the search query on the database 126 to identify one or more records matching the first portion of the search query. The first portion of the search query can include search terms, or query criteria derived from search terms, corresponding to inherent or non-optional elements of desired database records. A second portion of the search query can include search terms, or query criteria derived from search terms, corresponding to a set of optional elements of the desired database records. In these embodiments, database records matching the first portion of the search query (identified database records) can used to select one or more additional records in the database 126. Elements of the one or more additional records can correspond to optional elements associated with the records matching the first portion of the search query.

At operation 315, the query system 150 may use selection component 215 to select one or more elements from the additional records (e.g., optional elements) to augment the identified database records. In some embodiments, the additional records may be the records identified in operation 310. Augmenting the identified database records can include associating one or more of the optional elements with one or more of the identified database records, such as to cause, or improve, a match between the augmented database record and the second portion of the search query. In some embodiments, a combination of one more optional elements to associate with an identified database record can be selected based on the search query (e.g., the search request), the elements of the identified database record, and historical data. Such historical data can include, for example, user histories, database records that satisfied past search requests, demographic information of past users, or any other set of historical data available to the query system 150. Such historic data can be used to generate a predictive model to estimate or predict the likelihood that augmenting an identified database record with a selected optional element cause the augmented database record to satisfy a search request. In some embodiments, the predictive model may use at least a portion of the search query, the identified record and corresponding additional records, as parameters.

In some embodiments, one or more optional elements selected according to the operation 315 may be associated with a database record identified in operation 310 to cause the identified record to match both a first portion of the search query, and a second portion of the search query, as described herein. Such one or more optional elements can also be associated with the identified record to increase the likelihood that the identified record will satisfy the search request received from user 106.

In certain embodiments, one or more records identified in operation 310 can match an entire search query generated by interface component 205 in operation 305. In these embodiments, executing operation 310 can include identifying one or more records matching the search query generated at operation 305, and retrieving one or more database records having elements corresponding to optional elements of the identified one or more records. In some embodiments, the retrieved one or more database records may be the records identified in operation 310. Operation 315 may then be executed by the selection component 215 to select, such as by using a predictive model generated from historical data, one or more optional elements to augment an identified record. In these embodiments, the selected optional element may be used to augment the identified record to case the augmented record to have a greater likelihood of satisfying the search request than another record of the one or more identified record. In some embodiments, increasing likelihood of an identified record satisfying a search request can include increasing the relevance of the record to the search request.

In some embodiments, the query system 150 can generate a virtual or temporary database table using one or more augmented database records, and execute the search query generated at operation 305 on the virtual or temporary database to identify database records matching the search request received at operation 305.

Augmenting a database record identified at operation 310 may include adjusting one or more elements (e.g., a value of one or more elements) of the identified database record, as shown in operation 320. In some embodiments, an element of an identified record may be adjusted when associating on optional element with the identified database record causes a change in one or more elements of the identified database record. Returning to the example of the network-based marketplace, an identified database record can be a listing for an item offered for sale, while the optional element can be a warranty (e.g., a two-year warrant) associated with the item. Associating the warranty with the listing of the item can a change in the price of the listing (e.g., an element of the listing record). Consequently, the price of the listed item may be adjusted, according to operation 320, to reflect the new price of the listing after the addition of the warranty. Adjustment component 220 can automatically adjust one or more selected elements (e.g., the price of a listing of an item) based on historical data, limits set by a producer, or a set of predetermined values associated with the selected element and an optional element. As an example, the database 126 can include data indicating the cost of one or more shipping or warrant options for a listing of an item. The pricing data may be used by the adjustment component 220 at operation 320 to automatically adjust the listing price of an item in response to augmenting the listing with an optional warranty or shipping method. As another example, the pricing data may indicate a value of an optional element to a seller or a buyer. The adjustment component 220 may use this pricing data to adjust the listing price of an item, when the listing includes the optional element, based on the value of optional element to at least one of the buyer and the seller.

At operation 325, the query system 150 can generate a formatted user interface (e.g., a graphical user interface) including a representation of one or more database records matching the search request received in operation 305. In some embodiments, the formatted user interface may be generated according to one or more display characteristics of a remote computing device that will receive the formatted representation. The one or more database records may include one or more augmented records, selected and modified as described herein. In some embodiments, the representation of the augmented database record may include an adjusted element of the augmented database record and one or more optional elements. Returning to the networked marketplace example, the query system 150 can use presentation component 225 to generate a formatted user interface (e.g., a webpage including one or more input fields or controls) showing one or more listings of items matching a search request including, for example, images of the items, a representation of one or more optional features automatically associated with the items (e.g., a warranty listing, a sale format, a shipping option, or a return policy), and adjusted prices of the items.

At operation 330, the query system 150 can use the presentation component 225 to cause presentation of the formatted user interface on the remote computing device associated with the search request. The presentation component 225 can cause presentation of the formatted user interface on the remote computing device by transmitting the formatted user interface to the remote computing device (e.g., client device 110) over the network 104, such as to case a component of the query system 150 (or a component of the network-based presentation system 102) executing on the remote computing device to render the formatted user interface.

In some embodiments, the query system 150 can use the techniques described herein to provide a set of recommendations for default, as well as optional, elements for a database record. In these embodiments, the query system 150 can receive data associated with a new database record, such as from a producer. The query system 150 can then access, based on the received data, historical data indicating a likelihood that one or more elements of a set of one or more database record corresponding to optional elements (or features) of database records similar to the new database record will cause the new database record to satisfy prospective search requests. The query system 150 can then select one or more optional elements based on a threshold condition, such as a threshold likelihood. The query system 150 can then generate a formatted user interface including a representation of new database record and the one or more optional elements. The query system 150 can then cause presentation of the formatted user interface (e.g., the producer interface, FIG. 4) on a remote computing device associated with the received data. The query system 150 can then receive, after the presentation, a selection of at least one of the one or more elements from the remote computing system. The query system 150 can then store the received data and the selection of the at least one of the one or more elements in the new database record.

In some embodiments, the search request received at operation 305 can include an update to a previously received search request. The update may include a change to one or more search terms, such as to change the search terms in a second portion of the database search query generated at operation 315 corresponding to a set of optional elements of the database records requested in the search request, as described in the discussion of operation 310. In these embodiments, generating the formatted user interface at operation 325 can include updating a previously generated formatted user interface to include a representation of database records matching the previously received search request and augmented to include one or more of the updated optional elements. In some cases, the database records may include a new set of one or more database records satisfying the updated search request.

Figure 4:
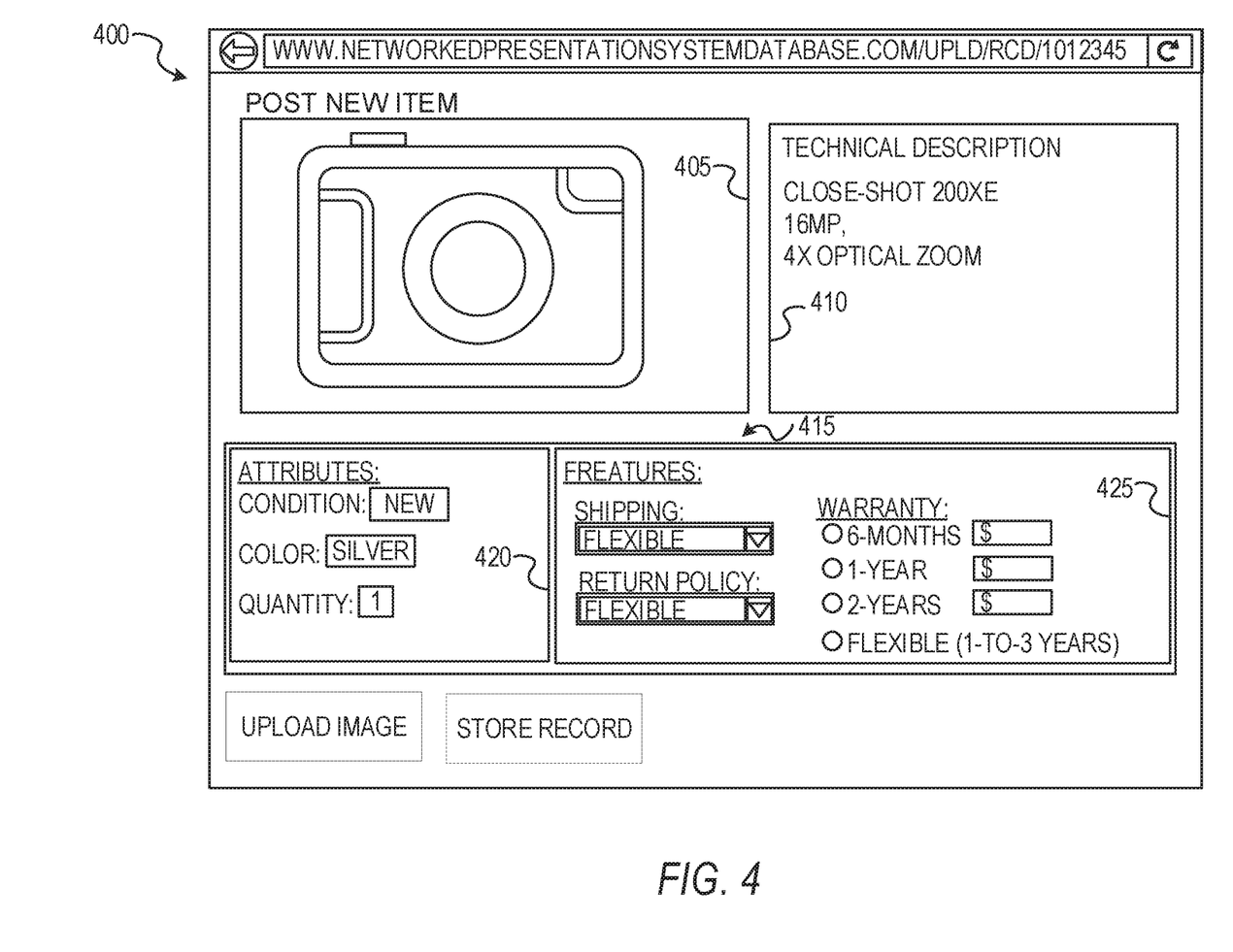
FIG. 4 is a diagram of an example of a producer interface to a query system, according to various embodiments.

NG. 4 is a diagram of an example of a formatted producer interface 400 to a query system, according to various embodiments. The producer interface 400 can be generated by the presentation component 225 of the query system 150 and transmitted to a remote computing system associated with a producer of database records for the query system. A component of the presentation component 225 executing on remote computing system can then cause the remote computing system to render the formatted producer interface 400. In some embodiments, the formatted producer interface 400 can be used by a producer to store database records (e.g., item listings) in a network-based presentation system, such as a networked marketplace. As shown in FIG. 4, the formatted producer interface 400 can include a display area 405, a description area 410, a features area 415, and controls for submitting a record to the network-based presentation system. In some embodiments, the display area 405 may be formatted to enable a producer to upload and preview one or more images associated with a database record or item listing. The description area 410 is formatted to enable the producer to input text descriptions associated with the database record. The features area 415 may include an attributes area 420 and an optional features area 425. The attributes area 420 can be formatted to enable a producer to associate one or more attributes (e.g., non-optional elements) with a database record. The optional features area 425 can be formatted to enable a producer to associate one or more features (e.g., optional elements) with a database record. In some embodiments, the optional features area 425 be automatically populated with a set of one or more recommended default or optional features, as described herein.

Figure 5:
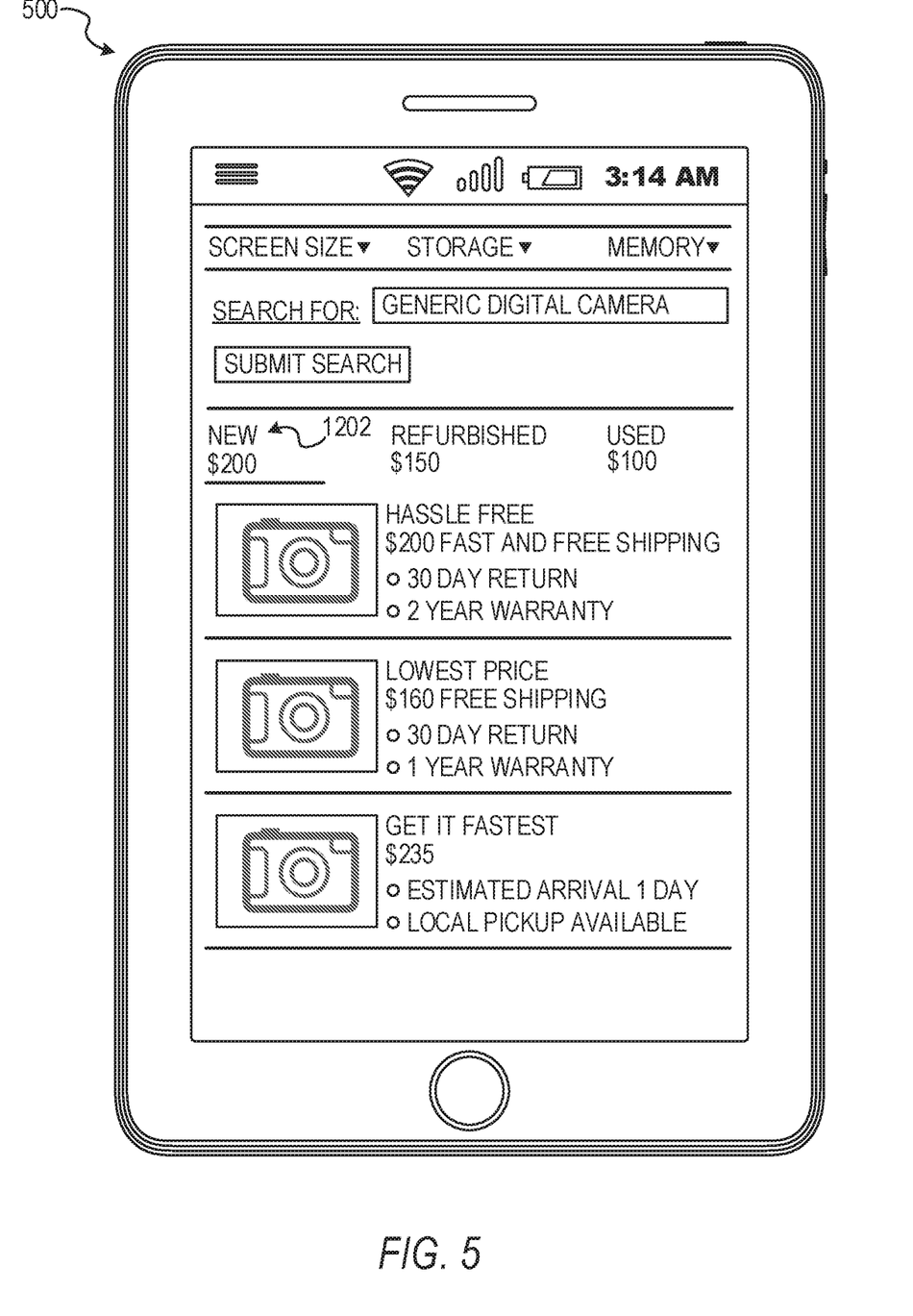
FIG. 5 is a diagram of an example of a consumer interface to a query system, according to various embodiments.

FIG. 5 is a diagram of an example of a formatted consumer interface to a network-based presentation system, according to various embodiments. The formatted consumer interface 500 can be generated by the presentation component 225 of the query system 150 and transmitted to a remote computing system associated with a consumer of database records for the query system, A component of the presentation component 225 executing on remote computing system can then cause the remote computing system to render the formatted consumer interface 500. In some embodiments, the formatted consumer interface 500 can be used by a consumer (e.g., user 106 in FIG. 1) to generate search requests for database records (e.g., item listings) stored in a query system associated with a network-based presentation system, such as a networked marketplace. In some embodiments, a consumer can also use the formatted consumer interface 500 purchase items associated with database records provided in response to the generated search requests. As shown in FIG. 5, the formatted consumer interface 500 can include a display area formatted to display portions of one or more augmented database records, as described herein. The display area, for example, includes displays of three database records matching search request for a "generic digital camera". Each matching database record includes a unique set of automatically selected optional features and a price, adjusted according to the optional features.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS), For example, at least some of the operations may be performed by a group of computers (as examples of machines including processors with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Example Machine Architecture and Machine-Readable Medium

Figure 6:
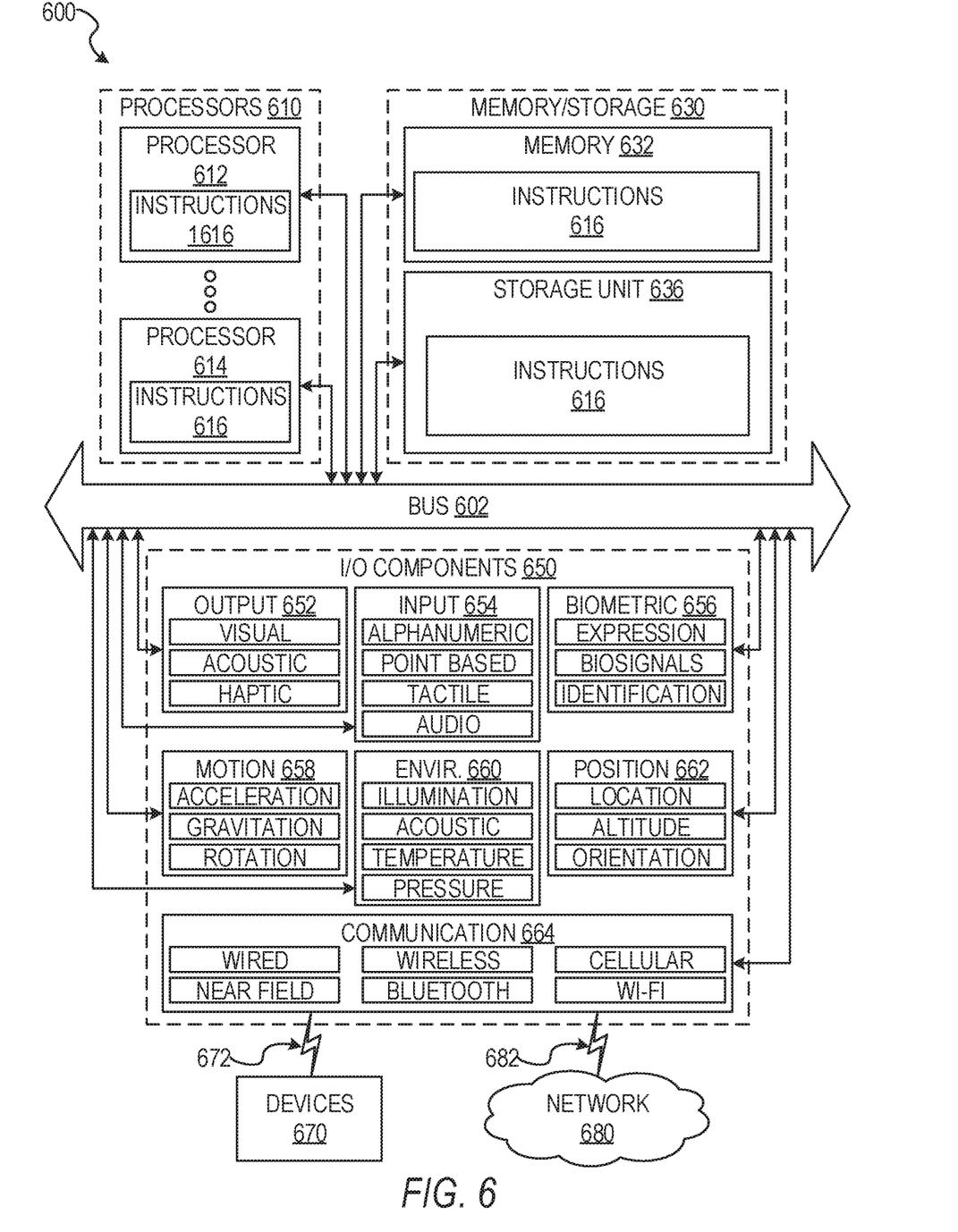
FIG. 6 illustrates a diagrammatic representation of a machine in the form of a computer system within which a set of instructions may be executed for causing the machine to perform any one or more of the methodologies discussed herein, according to various embodiments.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions may cause the machine to execute the flow diagrams of FIG. 3. The instructions transform the general, non-programmed machine into a particular machine programmed to carry out the described and illustrated functions in the manner described. In alternative embodiments, the machine 600 may he coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by machine 600. Further, while only a single machine 600 is illustrated, the term "machine" shall also be taken to include a collection of machines 600 that individually or jointly execute the instructions 616 to perform any one or more of the methodologies discussed herein.

In some embodiments, the instructions 616 may include software applications and associated processes such applications 114, 132, and 140.

The machine 600 may include processors 610, memory 630, and I/O components 650, which may he configured to communicate with each other such as via a bus 602. In an example embodiment, the processors 610 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 612 and processor 614 that may execute instructions 616. The term "processor" is intended to include multi-core processor that may comprise two or more independent processors (sometimes referred to as "cores") that may execute instructions contemporaneously. Although FIG. 6 shows multiple processors, the machine 600 may include a single processor with a single core, a single processor with multiple cores (e.g., a multi-core process), multiple processors with a single core, multiple processors with multiples cores, or any combination thereof.

The memory/storage 630 may include a memory 632, such as a main memory, or other memory storage, and a storage unit 636, both accessible to the processors 610 such as via the bus 602. The storage unit 636 and memory 632 store the instructions 616 embodying any one or more of the methodologies or functions described herein. The instructions 616 may also reside, completely or partially, within the memory 632, within the storage unit 636, within at least one of the processors 610 (e.g., within the processor's cache memory), or any suitable combination thereof, during execution thereof by the machine 600. Accordingly, the memory 632, the storage unit 636, and the memory of processors 610 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 616. The term "machine-readable medium" shall also be taken to include any medium, or combination of multiple media, that is capable of storing instructions (e.g., instructions 616) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. I/O components 650 are grouped according to functionality merely for simplifying the following discussion and the grouping is in no way limiting. In various example embodiments, the I/O components 650 may include output components 652 and input components 654. The output components 652 may include visual components (e.g., a display such as a plasma display panel (PDP), a light emitting diode (LEI)) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 662 may include location sensor components (e.g., a Global Position System (GPS) receiver component), altitude sensor components (e.g., altimeters or barometers that detect air pressure from which altitude may be derived), orientation sensor components (e.g., magnetometers and the like.

Communication may be implemented using a wide variety of technologies. The I/O components 650 may include communication components 664 operable to couple the machine 600 to a network 680 or devices 670 via coupling 682 and coupling 672 respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., a peripheral device coupled via a Universal Serial Bus (USB)).

Moreover, the communication components 664 may detect identifiers or include components operable to detect identifiers. For example, the communication components 664 may include Radio Frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 680 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network and the coupling 682 may be a Code Division Multiple Access (CDMA) connection, a. Global System for Mobile communications (GSM) connection, or other type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third. Generation Partnership Project (3GPP) including 3G, fourth generation wireless (4G) networks, Universal Mobile Telecommunications System (UNITS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., hypertext transfer protocol (HTTP)). Similarly, the instructions 616 may be transmitted or received using a transmission medium via the coupling 672 (e.g., a peer-to-peer coupling) to devices 670, The term "transmission medium" shall be taken to include any, intangible medium that is capable of storing, encoding, or carrying instructions 616 for execution by the machine 600, and includes digital or analog communications signals or other intangible medium to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system, comprising:

one or more processors; and a non-transitory machine-readable storage device comprising processor executable instructions that, when executed by the one or more processors, cause the one or more processors to perform operations comprising:

receiving data associated with a new database record from a seller of a first product;

accessing, based on the received data, historical data indicating a likelihood that an optional element of a set of database records that corresponds to the new database record will cause the new database record to satisfy a future search request, the set of database records matching a same search request as the new database record and differing from the new database record by one or more optional features;

in response to determining that the likelihood of the optional element corresponds to a threshold, generating a graphical user interface for presentation to the seller of the first product comprising a representation of the new database record and the optional element of the set of database records;

receiving input from the seller of the first product to enable the optional element in the graphical user interface as one of a plurality of optional elements enabled by the seller and to store data representing the optional element enabled by the seller in the new database record as one or more database records of a network based publication system;

after receiving the input from the seller, receiving, from a remote computing device, a search request for the one or more database records of the network based publication system;

in response to the search request, identifying a first database record comprising the new database record corresponding to at least a portion of the search request, the first database record having a first element;

in response to the search request, using the first database record corresponding to the first product to identify additional records corresponding to a plurality of different products that match the portion of the search request, the identified additional records comprising the optional element;

in response to receiving the search request, based on the identified additional records comprising the optional element and that the identified additional records correspond to the plurality of different products, automatically selecting the optional element from the plurality of optional elements to augment the first database record corresponding to the first product;

in response to automatically selecting the optional element based on the optional element of the additional records corresponding to the plurality of different products, automatically adjusting the first element of the first database record based on a value associated with the automatically selected optional element to enable the first to be purchased in accordance with the adjusted first element; and causing, in response to the search request, presentation of a formatted user interface comprising a representation of the augmented first database record and the identified additional records on the remote computing device.

2. The system of claim 1, wherein the operations further comprise:

causing the graphical user interface to be displayed to the seller for generating an item listing, the graphical user interface comprising an attributes area that includes non-optional elements of the item listing and an optional features area comprising optional elements of the item listing; and automatically populating the optional elements in the optional features area presented to the seller with a set of one or more recommended default optional features that are identified based on the historical data.

3. The system of claim 1, wherein the first element comprises a listing price for a product, and wherein the operations further comprise changing the listing price of the product represented in the formatted user interface based on the automatically selected optional element.

4. The system of claim 1, wherein automatically selecting the optional element, in response to receiving the search request, causes the first database record to have a greater likelihood of satisfying the search request than another database record of the one or more database records, the operations further comprising:

responsive to the first database record having the greater likelihood of satisfying the search request than the another database record and in response to receiving the search request for the one or more database records, generating the formatted user interface.

5. The system of claim 1, wherein the operations further comprise:

adjusting one or more elements of a plurality of database records to generate a plurality of augmented database records by associating the optional element with the plurality of database records;

generating a virtual or temporary database using the plurality of augmented database records associated with the optional element; and executing the future search request on the virtual or temporary database to identify database records matching the future search request.

6. The system of claim 1, wherein the operations further comprise:

accessing, by one or more hardware processors using the received data, the historical data indicating a likelihood that one or more elements will cause the new database record to satisfy future search request;

selecting the one or more elements based on a threshold condition, the threshold condition based on the indicated likelihood;

generating another formatted user interface including a representation of new database record and the one or more elements;

causing presentation of the another formatted user interface on a computing device associated with the received data;

receiving, after the presentation, a selection of at least one of the one or more elements; and storing the received data and the selection of the at least one of the one or more elements in the new database record.

7. The system of claim 2, wherein the operations further comprise:

accessing historical data comprising user histories, database records that satisfied past search requests, and demographic information of past users; and generating a predictive model for identifying the optional elements that are automatically populated using the historical data, the predictive model estimating a likelihood that augmenting an identified database record with a selected optional element will cause the augmented database record to satisfy a search request, the predictive model using at least a portion of the search request, the first database record, and the identified additional records as parameters, an output of the predictive model being used to control automatic selection of the optional element.

8. A method, comprising:

receiving data associated with a new database record from a seller of a first product;

accessing, based on the received data, historical data indicating a likelihood that an optional element of a set of database records that corresponds to the new database record will cause the new database record to satisfy a future search request, the set of database records matching a same search request as the new database record and differing from the new database record by one or more optional features;

in response to determining that the likelihood of the optional element corresponds to a threshold, generating a graphical user interface for presentation to the seller of the first product comprising a representation of the new database record and the optional element of the set of database records;

receiving input from the seller of the first product to enable the optional element in the graphical user interface as one of a plurality of optional elements enabled by the seller and to store data representing the optional element enabled by the seller in the new database record as one or more database records of a network based publication system;

after receiving the input from the seller, receiving, from a remote computing device, a search request for the one or more database records of the network based publication system;

in response to the search request, identifying a first database record comprising the new database record corresponding to at least a portion of the search request, the first database record having a first element;

in response to the search request, using the first database record corresponding to the first product to identify additional records corresponding to a plurality of different products that match the portion of the search request, the identified additional records comprising the optional element;

in response to receiving the search request, based on the identified additional records comprising the optional element and that the identified additional records correspond to the plurality of different products, automatically selecting the optional element from the plurality of optional elements to augment the first database record corresponding to the first product in response to automatically selecting the optional element based on the optional element of the additional records corresponding to the plurality of different products, automatically adjusting the first element of the first database record based on a value associated with the automatically selected optional element to enable the first to be purchased in accordance with the adjusted first element; and causing, in response to the search request, presentation of a formatted user interface comprising a representation of the augmented first database record and the identified additional records on the remote computing device.

9. The method of claim 8, wherein the optional element comprises a sales format.

10. The method of claim 8, wherein the first element comprises a listing price for a product, the method further comprising changing the listing price of the product represented in the formatted user interface based on the automatically selected optional element, wherein the optional element comprises one or more accessories associated with the product.

11. The method of claim 8, wherein automatically selecting the optional element, in response to receiving the search request, causes the first database record to have a greater likelihood of satisfying the search request than another database record of the one or more database records, the method further comprising:

responsive to the first database record having the greater likelihood of satisfying the search request than the another database record and in response to receiving the search request for the one or more database records, generating the formatted user interface.

12. The method of claim 8, further comprising:

accessing, by one or more hardware processors, the historical data indicating the value of the optional element to at least one of a first entity generating the first database record and at least one entity generating the search request, wherein adjusting the first element comprises adjusting the first element using the indicated value.

13. The method of claim 8, further comprising:

accessing, by one or more hardware processors using the received data, the historical data indicating a likelihood that one or more elements will cause the new database record to satisfy the future search request;

selecting the one or more elements based on a threshold condition, the threshold condition based on the indicated likelihood;

generating another formatted user interface including a representation of new database record and the one or more elements;

causing presentation of the another formatted user interface on a computing device associated with the received data;

receiving, after the presentation, a selection of at least one of the one or more elements; and storing the received data and the selection of the at least one of the one or more elements in the new database record.

14. The method of claim 8, further comprising:
storing the historical data reflecting database records that satisfied past search requests; and
generating a predictive model for augmenting records with selected optional elements, the predictive model estimates a likelihood that augmenting an individual database record with a selected optional element will cause the augmented individual database record to satisfy a search request.

15. The method of claim 14, wherein the first element comprises a price of an item, and wherein the augmented individual database record satisfies a search request when a buyer purchases an item associated with the augmented individual database record.

16. The method of claim 8, wherein the formatted user interface is on an electronic marketplace.

17. The method of claim 16, wherein the optional element is at least one of a shipping option, a return policy, a sale format, and condition of an item, wherein a price of the item represented by the first element is adjusted in response to automatically selecting the optional element.

18. The method of claim 16, wherein the adjusted first element is a price of an item adjusted by the value of the optional element.

19. A non-transitory machine-readable storage medium comprising processor executable instructions that, when executed by a processor of a machine, cause the machine to perform operations comprising:
receiving data associated with a new database record from a seller of a first product;
accessing, based on the received data, historical data indicating a likelihood that an optional element of a set of database records that corresponds to the new database record will cause the new database record to satisfy a future search request, the set of database records matching a same search request as the new database record and differing from the new database record by one or more optional features;
in response to determining that the likelihood of the optional element corresponds to a threshold, generating a graphical user interface for presentation to the seller of the first product comprising a representation of the new database record and the optional element of the set of database records;
receiving input from the seller of the first product to enable the optional element in the graphical user interface as one of a plurality of optional elements enabled by the seller and to store data representing the optional element enabled by the seller in the new database record as one or more database records of a network based publication system;
after receiving the input from the seller, receiving, from a remote computing device, a search request for the one or more database records of the network based publication system;
in response to the search request, identifying a first database record comprising the new database record corresponding to at least a portion of the search request, the first database record having a first element;
in response to the search request, using the first database record corresponding to the first product to identify additional records corresponding to a plurality of different products that match the portion of the search request, the identified additional records comprising the optional element;
in response to receiving the search request, based on the identified additional records comprising the optional element and that the identified additional records correspond to the plurality of different products, automatically selecting the optional element from the plurality of optional elements to augment the first database record corresponding to the first product;
in response to automatically selecting the optional element based on the optional element of the additional records corresponding to the plurality of different products, automatically adjusting the first element of the first database record based on a value associated with the automatically selected optional element to enable the first to be purchased in accordance with the adjusted first element; and
causing, in response to the search request, presentation of a formatted user interface comprising a representation of the augmented first database record and the identified additional records on the remote computing device.

20. The non-transitory machine-readable storage medium of claim 19, wherein automatically selecting the optional element, in response to receiving the search request, causes the first database record to have a greater likelihood of satisfying the search request than another database record of the one or more database records, and the operations further comprising:
responsive to the first database record having the greater likelihood of satisfying the search request than the another database record and in response to receiving the search request for the one or more database records, generating the formatted user interface.

* * * * *